United States Patent
Kumar et al.

(10) Patent No.: US 12,361,194 B2
(45) Date of Patent: Jul. 15, 2025

(54) DYNAMIC CLOCK TREE PLANNING USING FEEDTIMING COST

(71) Applicant: Synopsys, Inc., Mountain View, CA (US)

(72) Inventors: Vivek Kumar, Bangalore (IN); Prashant Gupta, Bangalore (IN)

(73) Assignee: Synopsys, Inc., Mountain View, CA (US)

( * ) Notice: Subject to any disclaimer, the term of this patent is extended or adjusted under 35 U.S.C. 154(b) by 638 days.

(21) Appl. No.: 17/831,367

(22) Filed: Jun. 2, 2022

(65) Prior Publication Data

US 2022/0398372 A1    Dec. 15, 2022

(30) Foreign Application Priority Data

Jun. 11, 2021   (IN) .............................. 202141026083

(51) Int. Cl.
     *G06F 30/396*    (2020.01)
     *G06F 30/3312*    (2020.01)
     *G06F 30/337*    (2020.01)
     *G06F 30/373*    (2020.01)
     *G06F 30/392*    (2020.01)
     *G06F 30/398*    (2020.01)

(52) U.S. Cl.
     CPC .......... *G06F 30/396* (2020.01); *G06F 30/392* (2020.01); *G06F 30/3312* (2020.01); *G06F 30/337* (2020.01); *G06F 30/373* (2020.01); *G06F 30/398* (2020.01)

(58) Field of Classification Search
     CPC .... G06F 30/396; G06F 30/392; G06F 30/398; G06F 30/3312; G06F 30/337; G06F 30/373

USPC .......... 716/113, 114, 122, 134, 108; 703/16
See application file for complete search history.

(56) References Cited

U.S. PATENT DOCUMENTS

| | | | | |
|---|---|---|---|---|
| 6,112,022 A | * | 8/2000 | Wei | G06F 30/33 716/108 |
| 6,249,901 B1 | * | 6/2001 | Yuan | G06F 30/33 716/108 |
| 6,763,513 B1 | * | 7/2004 | Chang | G06F 30/327 716/114 |
| 8,725,483 B2 | * | 5/2014 | Ei-Essawy | G06F 30/394 716/126 |
| 10,255,396 B2 | * | 4/2019 | Bouzouzou | G06F 30/396 |

(Continued)

FOREIGN PATENT DOCUMENTS

| | | | | |
|---|---|---|---|---|
| KR | 20150130285 A | * | 11/2015 | ........... G06F 30/396 |
| WO | WO-2014153539 A1 | * | 9/2014 | ......... G06F 17/5077 |

*Primary Examiner* — Phallaka Kik
(74) *Attorney, Agent, or Firm* — Lowenstein Sandler LLP

(57) ABSTRACT

A processing device identifies a first clock tree topology for a circuit design, the first clock tree topology having a threshold feedthrough count and a first timing solution. The processing device further identifies one or more additional clock tree topologies for the circuit design, each of the one or more additional clock tree topologies having a different respective feedthrough count that is less than the threshold feedthrough count, and each of the one or more additional clock tree topologies comprising a respective timing solution. In addition, the processing device receives a selection of at least one of the first clock tree topology or the one or more additional clock tree topologies, and generates the circuit design according to the selection.

20 Claims, 7 Drawing Sheets

(56) References Cited

U.S. PATENT DOCUMENTS

| | | | |
|---|---|---|---|
| 2012/0110533 A1* | 5/2012 | Lasher | G06F 30/394 |
| | | | 716/114 |
| 2014/0289690 A1* | 9/2014 | Chopra | G06F 30/396 |
| | | | 716/113 |
| 2015/0213186 A1* | 7/2015 | Le Bars | G06F 30/3315 |
| | | | 716/114 |
| 2015/0269298 A1* | 9/2015 | Dai | G06F 30/327 |
| | | | 716/134 |
| 2017/0293706 A1* | 10/2017 | Bouzouzou | G06F 30/327 |

\* cited by examiner

DYNAMIC CLOCK TREE PLANNING USING FEEDTIMING COST

RELATED APPLICATIONS

This application claims the benefit of Indian Patent Application No. 202141026083, filed Jun. 11, 2021, the entire contents of which are hereby incorporated by reference herein.

TECHNICAL FIELD

The present disclosure relates to the field of integrated circuit design, and in particular to dynamic clock tree planning using feedtiming cost in a circuit design.

BACKGROUND

Clock Tree Planning (CTP) is a part of a typical design planning (DP) flow. In design planning, the design of an integrated circuit is seen to be made of sub-designs (called blocks) instead of one flat design. This enables modularity and abstraction in handling complex optimization problems. It requires less computational resources while allowing a user to quickly experiment with different ideas. CTP solves the problem of clock distribution among the blocks.

One objective of CTP is to design a clock distribution network with optimized timing and feedthrough count. In brief, CTP (1) brings clock tree awareness to design planning when clocks are ideal, (2) generates clock pin placement (including feedthrough creation) driven by tree physical topology, and (3) provides better correlation between design planning, implementation, and block-integration. CTP further helps to budget the latency during design planning which is later used for implementation.

SUMMARY

In one embodiment, a processing device identifies a first clock tree topology for a circuit design, the first clock tree topology having a threshold feedthrough count and a first timing solution. The processing device further identifies one or more additional clock tree topologies for the circuit design, each of the one or more additional clock tree topologies having a different respective feedthrough count that is less than the threshold feedthrough count, and each of the one or more additional clock tree topologies comprising a respective timing solution. The first clock tree topology and the one or more additional clock tree topologies each comprise a respective clock path extending from a clock source to a load, and the circuit design comprises one or more circuit components arranged in a physical layout. The threshold feedthrough count and the different respective feedthrough counts each comprise a respective number of times that the respective clock path crosses a boundary of the one or more circuit components.

To identify the one or more additional clock tree topologies, the processing device performs a number of iterations of a clock tree topology process incorporating a feed-timing cost parameter, each iteration to identify a respective additional clock tree topology. The feed-timing cost parameter comprises a vector of path-length and encountered feedthroughs count. The processing device further sets an allowed feedthrough count to zero for a first iteration of the number of iterations, and increments the allowed feedthrough count by a set amount for any additional iterations of the number of iterations.

In addition, the processing device causes presentation of the first clock tree topology and the one or more additional clock tree topologies for selection in a graphical user interface, and receives a selection of at least one of the first clock tree topology or the one or more additional clock tree topologies, and generates the circuit design according to the selection. Generating the circuit design according to the selection comprises forming the clock path with respect to the one or more circuit components to have the respective feedthrough count of the selected clock tree topology.

BRIEF DESCRIPTION OF THE DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

DETAILED DESCRIPTION

Figure 1A:
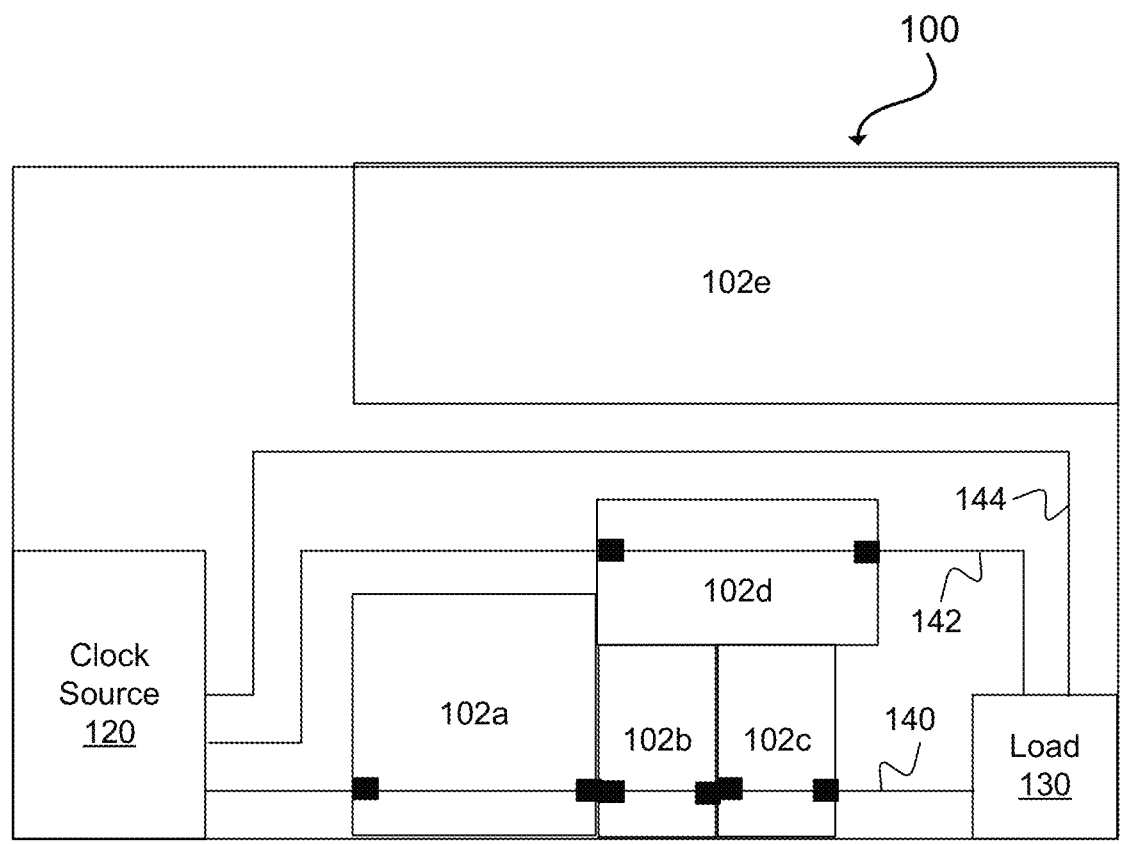
FIG. 1A is a block diagram illustrating a circuit design with multiple clock tree topologies in accordance with some embodiments of the present disclosure.

Aspects of the present disclosure relate to dynamic clock tree planning (CTP) using feedtiming cost in a circuit design. CTP is one portion of a larger design planning process, and generally includes determining a clock distribution network for a hierarchical design. One objective of CTP is to find physical locations of the existing clock pins and create new feedthroughs (with corresponding physical locations) if needed to reach sinks connected to those clock pins. For example, a Clock Tree Synthesis (CTS) engine can be deployed to identify one or more clock tree topologies for the circuit design that routes a clock signal path around different circuit components of the design or through certain components (e.g., using feedthroughs) from a clock source to a load. In presently available solutions, however, the CTS engine accounts only for timing optimization when designing a clock tree topology, and does not consider the number of feedthroughs included.

A feedthrough is created in each instance where the clock path crosses the boundary of a block or other component in the circuit design. In certain circumstances, the inclusion of additional feedthroughs may complicate the circuit design or otherwise be undesirable. A feedthrough involves the addition of at least two clock pins to a component to receive the clock signal and pass it on to a subsequent component. Depending on the size and design of a given component, there may not be adequate space for additional clock pins. In addition, changes to the component may compromise an already completed and/or optimized design and, therefore, may not be possible. The clock tree topology generated by the CTS engine may, however, identify a timing optimal clock signal path, even at the expense of adding additional feedthroughs. In some instances it may be preferred to balance the timing of a clock signal and the number of feedthroughs in the circuit design (e.g., to accept a higher timing cost for a longer clock signal path in exchanges for a lower number of feedthroughs).

Certain systems attempt to consider the feedthrough count of a given clock tree topology, such as by adding some constant value to the determined timing cost whenever the clock signal path crosses the boundary of a circuit component and a feedthrough is added. In the end, however, the impact of actual timing (e.g., skew and latency) is blurred with the timing cost attributed to the feedthrough count, and the two cannot be separated. This can be referred to as "smeared costing" and can have negative consequences. For example, in a more complex layout, the same timing cost might be identified for a clock signal path with no feedthroughs and one with a high-number of feedthroughs, but such a difference would not be able to be identified by the circuit designer.

In each circuit design, the desired optimal solution might change. It is not necessary that an optimal solution always implies minimum timing and minimum feedthrough count. Due to various reasons, it may happen that the circuit designer does not want to disturb some hierarchies by creating new feedthroughs and is ready to choose a slightly longer path (e.g., with higher timing) as an optimal solution. Such a choice is not available when using conventional clock tree planning approaches, potentially resulting is less preferred circuit designs.

Aspects of the present disclosure address the above and other deficiencies by providing dynamic clock tree planning (CTP) using a new cost metric, referred to herein as the "feed-timing cost" parameter, in circuit designs. The feed-timing cost parameter is a vector of two values including path-length (representing the timing cost) and encountered feedthroughs count. When combined with a decision function, the vector can be used for generating different clock tree topology solutions. When considering the feed-timing cost, the clock tree generation process can allow a user to have better insight in the CTP solution space, by generating multiple good candidate solutions (i.e., different clock tree topologies) between one solution with optimal timing and another solution with optimal feedthrough count. The possible solutions can be presented to a circuit design or other user (e.g., in a user interface), a selection can be received, and the circuit can design can be finalized in view of the selection.

Advantages of the approach described herein include, but are not limited to, improved performance in the circuit design system. In particular, processing resource and storage capacity utilization are reduced, as the clock tree synthesis process need only be performed a single time, rather than being performed for each of the different clock tree topologies that are generated. The use of the feed-timing cost parameter allows for accurate measurement of the impact of additional feedthroughs to the clock tree topology and allows the circuit designer to balance the desire for lower timing and fewer feedthroughs. Accordingly, the clock tree planning process becomes more flexible and able to deliver multiple proposed solutions for the clock tree topology.

FIG. 1A is a block diagram illustrating a circuit design with multiple clock tree topologies in accordance with some embodiments of the present disclosure. As illustrated the circuit design 100 includes a number of circuit components 102a-102e arranged in a particular physical layout. Each of circuit components 102a-102e can be a discrete component that is ultimately packaged together into circuit design 100. For example, each of circuit components 102a-102e can have different functionality that operates independently or can be designed to interface with other circuit components to provide a common functionality. Each of circuit components 102a-102e can have a number of internal sub-components (not shown in FIG. 1A), which can be accessible by corresponding input/output pins (not shown in FIG. 1A). The physical layout of circuit components 102a-102e can be selected as part of the circuit design in order to make efficient use of the available space, to place certain components in specific locations (e.g., relative to one another), or randomly. In one embodiment, the circuit design 100 includes a clock source 120 designed to generate one or more clock signals and deliver those one or more clock signals to a load 130 via one or more clock paths.

As part of the circuit design process, processing logic (e.g., a clock tree synthesis engine) can identify a number of clock tree topologies for the circuit design 100, each of which is design to deliver a clock signal from clock source 120 to load 130 via a different clock path. Each clock tree topology can have a respective timing solution, which can be measured by a timing cost value representative of the associated latency and/or skew of the corresponding clock path. In general, a lower timing cost value may be preferred as such represents less latency and less skew in the clock signal being delivered from clock source 120 to load 130. Accordingly, a shorter clock path typically has a lower associated timing cost value than a longer clock path.

Circuit design 100 illustrates three different clock tree topologies, each representing a different clock path between clock source 120 and load 130. For example circuit design 100 includes clock paths 140, 142, and 144. In addition to presenting different timing solutions, each different clock path includes a different feedthrough count. As described above, a feedthrough is formed each time a clock path cross a boundary of one of circuit components 102a-102e. The feedthroughs in circuit design 100 are illustrated as solid block boxes on the boundaries of the various circuit components. In one embodiment, the feedthroughs represent clock pins of the circuit components configured to receive or send a clock signal on the corresponding clock path. As illustrated, clock path 140 has the shortest path length and thus the lowest timing cost value, but has six feedthroughs as it passes through the boundaries of circuit components 102a, 102b, and 102c, twice each. Clock path 142 has a longer path length and higher timing cost value, but has only two feedthroughs as it passes through the boundary of circuit component 102d twice. Clock path 144 has the longest path length and thus the highest timing cost value, but is optimized to have zero feedthroughs, as it does not pass through the boundary of any circuit components.

Figure 1B:
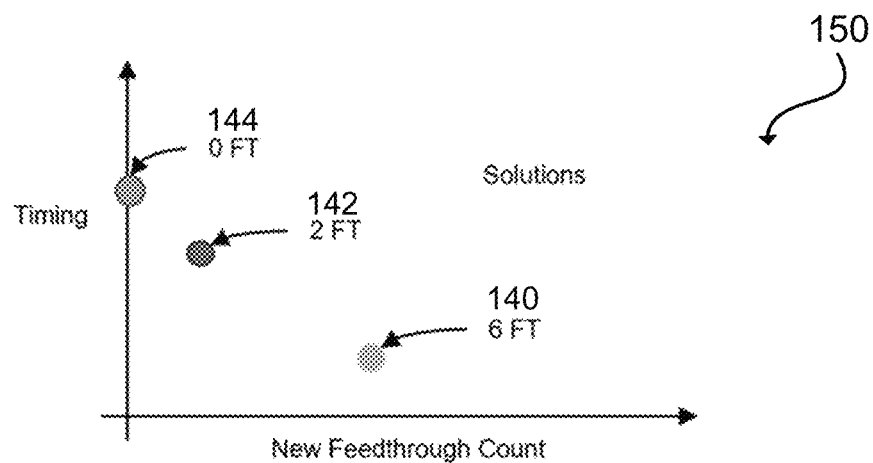
FIG. 1B is a graph plotting the timing solution against the feedthrough count for multiple clock tree topologies in accordance with some embodiments of the present disclosure.

The respective timing solutions and feedthrough counts are illustrated graphically in FIG. 1B. As illustrated in graph 150, clock path 140 has the lowest timing cost, as plotted on the y-axis, by the highest feedthrough count (i.e., 6 FT), as plotted on the x-axis. Clock path 144 has the highest timing cost, but the lowest feedthrough count (i.e., 0 FT). Clock path 142, meanwhile, has an intermediate timing cost and feedthrough count (i.e., 2 FT).

As will be described in more detail below, the processing logic can identify a number of clock tree topologies each having a different clock path, such as clock paths 140, 142, 144, with a corresponding timing solution and feedthrough count. The processing logic can present the different clock tree topologies to a circuit designer or other user (e.g., via a user interface) and can receive a selection of a desired topology. The user's exact selection may be driven by specific design requirements and the user may choose any of the available solutions. Responsive to receiving the selection, the processing logic can generate the final circuit design, such as circuit design 100, according to the selected clock tree topology.

Figure 2:
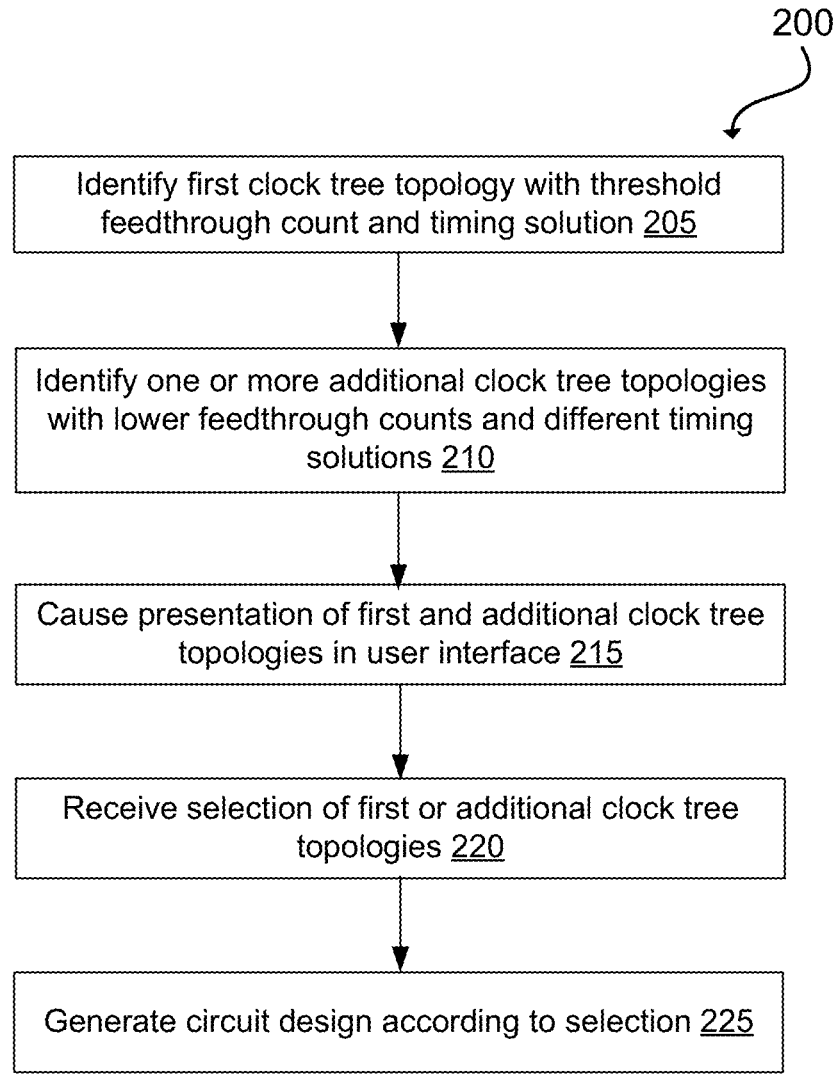
FIG. 2 is a flow diagram illustrating a method of dynamic clock tree planning (CTP) using feedtiming cost in a circuit design in accordance with some embodiments of the present disclosure.

FIG. 2 is a flow diagram illustrating a method of dynamic clock tree planning (CTP) using feedtiming cost in a circuit design in accordance with some embodiments of the present disclosure. The method 200 may be performed by processing logic that includes hardware (e.g., circuitry, dedicated logic, programmable logic, microcode, etc.), software (e.g., instructions run on a processor to perform hardware simulation), or a combination thereof. In one embodiment, method 200 may be performed by clock tree synthesis engine (e.g., executed by processing device 702 of FIG. 7).

Referring again to FIG. 2, at operation 205, the processing logic identifies a first clock tree topology for a circuit design, such as circuit design 100. In one embodiment, the first clock tree topology includes a first clock path having a threshold feedthrough count and a first timing solution. For example, the first clock tree topology could include clock path 140 which is a timing optimal solution having a lowest timing cost value. The number of incurred feedthroughs in clock path 140 (i.e., 6 FT) can be set as the threshold feedthrough count. The first clock tree topology includes a clock path extending from a clock source 120 to a load 130, and the circuit design 100 includes one or more circuit components 102a-102e arranged in a physical layout. The feedthrough count represents a number of times that the clock path 140 crosses a boundary of the one or more circuit components.

At operation 210, the processing logic further identifies one or more additional clock tree topologies for the circuit design 100. Each of the one or more additional clock tree topologies can include a different clock path with a different respective feedthrough count that is less than the threshold feedthrough count. In addition, each of the one or more additional clock tree topologies can have a respective timing solution, which may include a higher timing cost value than the first clock tree topology. For example, the additional clock tree topologies can include clock path 142 having a lower feedthrough count (i.e., 2 FT) and clock path 144 having zero feedthroughs (i.e., 0 FT). In other embodiments, the processing logic can identify some other number of clock tree topologies having different clock paths.

At operation 215, the processing logic causes presentation of the first clock tree topology and the one or more additional clock tree topologies for selection. For example, the processing logic may generate and provide a user interface, such as a graphical user interface, to present the identified clock tree topologies as selectable options. The selectable options can include an indication of the feedtiming cost parameter for each topology and/or an indication of the timing cost value and feedthrough count for each topology.

At operation 220, the processing logic receives a selection of at least one of the first clock tree topology or the one or more additional clock tree topologies. For example, a user, such as a circuit designer or other user, can make a selection via the user interface of one of the clock tree topologies. The user can make the selection in view of the feedtiming cost parameter or the individual timing cost value and feedthrough count for each topology and based on the specific design considerations of the circuit design 100.

At operation 225, the processing logic generates the circuit design according to the selection. In one embodiment, in order to generate the circuit design 100 according to the selection, the processing logic can form the clock path associated with the selected clock tree topology with respect to the one or more circuit components 102a-102e to have the respective feedthrough count of the selected clock tree topology.

Figure 3:
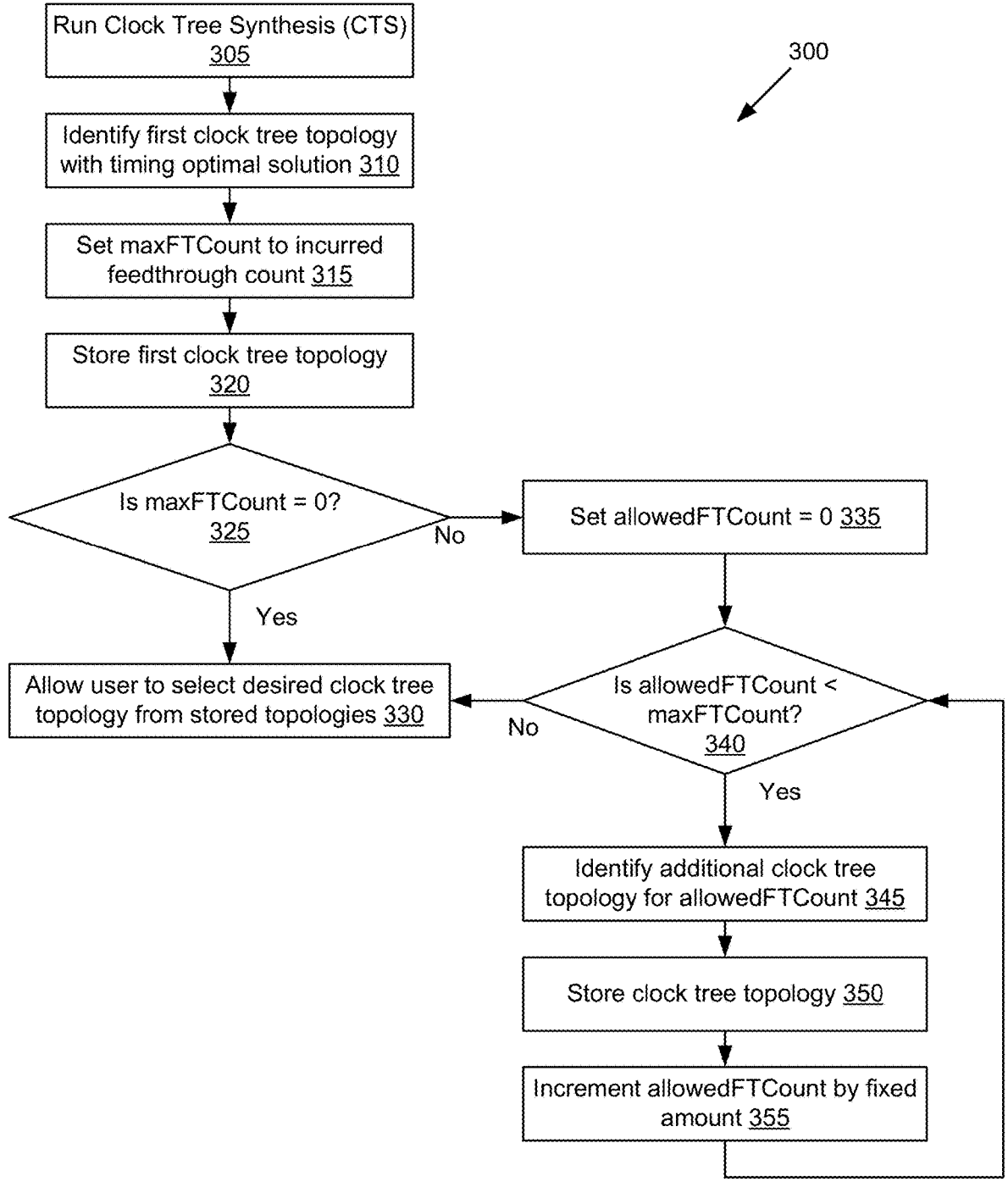
FIG. 3 is a flow diagram illustrating a method of generating multiple clock tree topologies with varying feedtiming costs for a circuit design in accordance with some embodiments of the present disclosure.

FIG. 3 is a flow diagram illustrating a method of generating multiple clock tree topologies with varying feedtiming costs for a circuit design in accordance with some embodiments of the present disclosure. The method 300 may be performed by processing logic that includes hardware (e.g., circuitry, dedicated logic, programmable logic, microcode, etc.), software (e.g., instructions run on a processor to perform hardware simulation), or a combination thereof. In one embodiment, method 300 may be performed by clock tree synthesis engine (e.g., executed by processing device 702 of FIG. 7).

Referring again to FIG. 3, at operation 305, the processing logic runs clock tree synthesis to identify the relevant set of clock sinks connected to the source and provide initial timing values (e.g., arrival time and phase delay) for the sink nodes. Clock tree synthesis (CTS) refers to a process for generating a physical design for distributing clock signals from one or more clock sources to sub-circuits within an integrated circuit, where the clock tree synthesis process generally aims to minimize clock skew and clock tree insertion delay, subject to some design constraints set by the circuit designer. For example, clock tree synthesis may attempt to have the same number of buffers in all of the paths from the clock source to each clock sink and to also keep the total length of the wires along each of the paths to be as close to equal as possible, without violating other design requirements of the circuit (e.g., routing the wires through areas of the integrated circuit reserved for other functions).

At operation 310, the processing logic identifies a first clock tree topology for a circuit design, such as circuit design 100. In one embodiment, the first clock tree topology includes a first clock path having an incurred feedthrough count and a first timing solution. For example, the first clock tree topology could include clock path 140 which is a timing optimal solution having a lowest timing cost value. The first clock tree topology includes a clock path extending from a clock source 120 to a load 130, and the circuit design 100 includes one or more circuit components 102a-102e arranged in a physical layout. The incurred feedthrough count represents a number of times that the clock path 140 crosses a boundary of the one or more circuit components.

Figure 7:
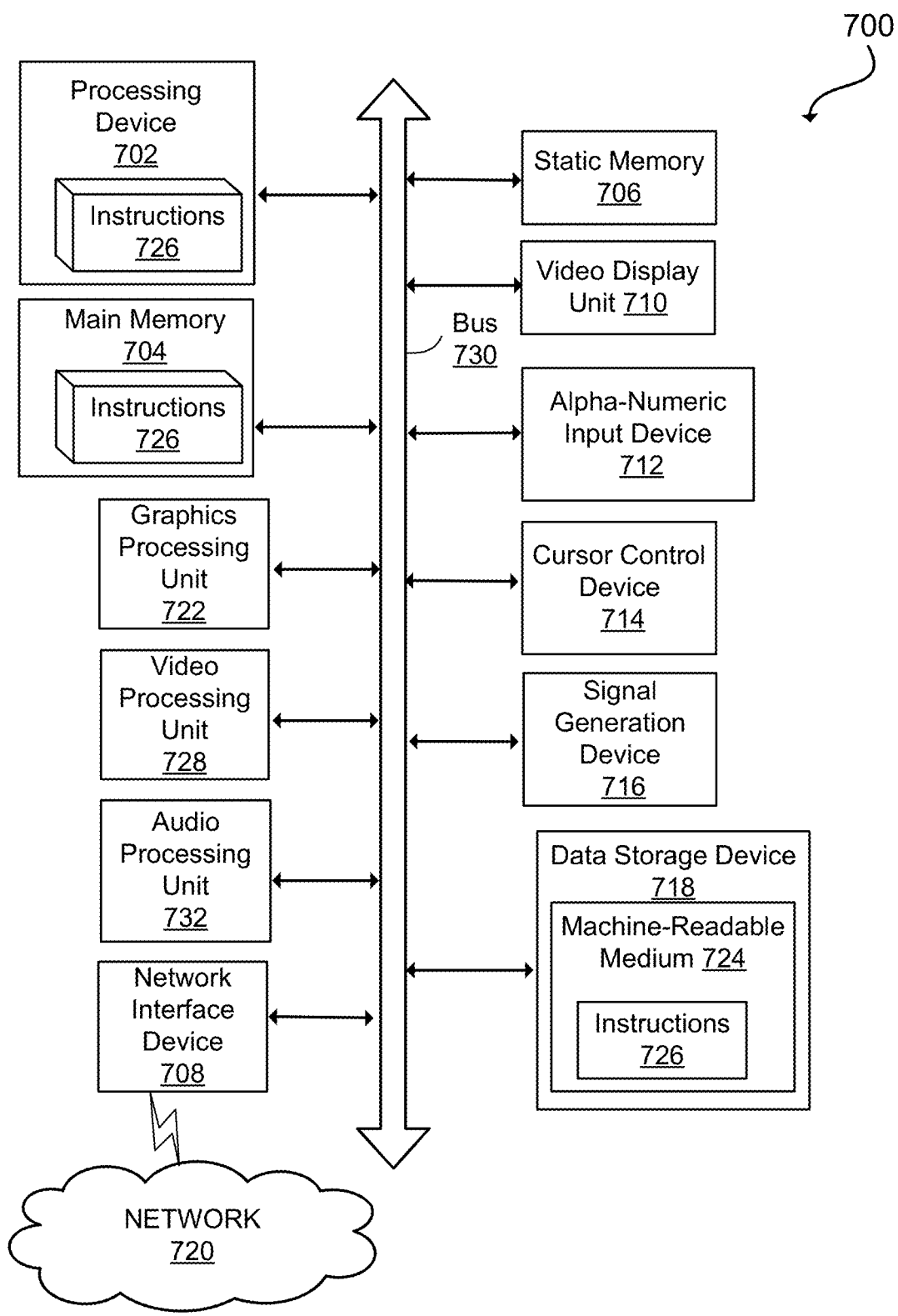
FIG. 7 depicts an abstract diagram of an example computer system in which embodiments of the present disclosure may operate.

At operation 315, the processing logic sets a value representing the maximum feedthrough count (i.e., maxFT-Count) to the number of incurred feedthroughs in clock path 140 (i.e., 6 FT). This value can also be referred to as a threshold feedthrough count. Since the first clock tree topology is a timing optimal solution, any other possible topology having a higher feedthrough count would necessarily be ignored. Accordingly, the maximum feedthrough count can be used to filter any additional clock tree topologies that are identified. At operation 320, the processing logic stores the first clock tree topology. For example, it can be stored in memory 704 or data storage device 718, as shown in FIG. 7, for later retrieval.

Figure 4:
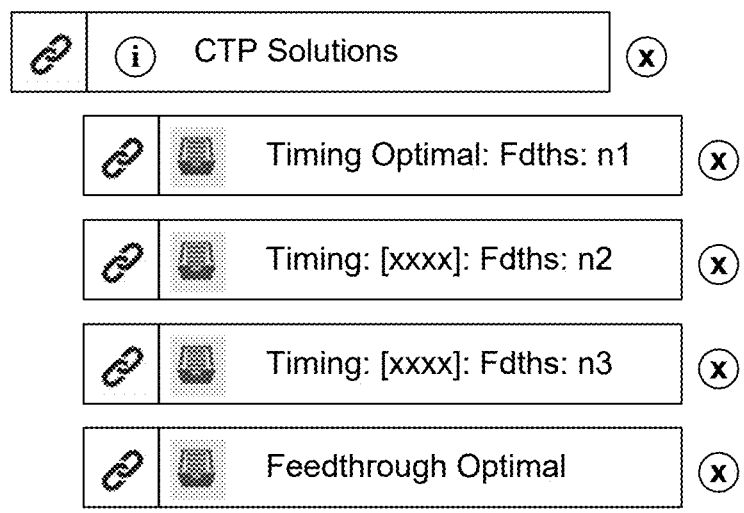
FIG. 4 is a diagram illustrating a graphical user interface for multi-solution output in accordance with some embodiments of the present disclosure.

At operation 325, the processing logic determines whether the maximum feedthrough count is equal to zero. If the maximum feedthrough count is equal to zero, then no additional clock tree topologies are necessary, since the first clock tree topology identified at operation 310 is both timing optimal and has zero feedthroughs. Accordingly, at operation 330, the processing logic allows the user to select the desired clock tree topology. For example, the processing logic can cause presentation of the stored clock tree topology or topologies for selection. For example, the processing logic may generate and provide a user interface, such as a graphical user interface 400 as shown in FIG. 4, to present the identified clock tree topologies as selectable options. The selectable options can include an indication of the feedtiming cost parameter for each topology and/or an indication of the timing cost value and feedthrough count for each topology. The processing logic can further receive a selection of a desired clock tree topology, for example, via the user interface 400. In one embodiment, if only one clock tree topology is available, the processing logic can automatically select that topology without requiring a user selection.

Referring again to FIG. 3, if the processing logic determines that the maximum feedthrough count is not equal to zero (i.e., is greater than zero) at operation 325, however, the processing logic proceeds to identify one or more additional clock tree topologies for the circuit design 100. For example, the processing logic can perform an iterative process to identify the additional clock tree topologies, each having a different feedthrough count, and potentially a different timing cost value. At operation 335, the processing logic can set an allowed feedthrough count parameter (i.e., allowedFTCount) equal to zero for a first iteration. At operation 340, the processing logic determines whether the allowed feedthrough count parameter (i.e., allowedFTCount=0) is less than the maximum feedthrough count identified at operation 315 (i.e., maxFTCount=6). If not, the processing logic returns to operation 330.

If, however, the allowed feedthrough count parameter is less than the maximum feedthrough count, at operation 345, the processing logic identifies an additional clock tree topology in view of the current allowed feedthrough count parameter. For the first iteration, since allowedFTCount=0, the processing logic can identify a clock path having zero feedthroughs (i.e., clock path 144) for circuit design 100. As noted above, the clock path 144 may have a higher timing cost value than the clock path 140. At operation 350, the processing logic stores the additional clock tree topology in memory 704 or data storage device 718, as shown in FIG. 7, for later retrieval.

At operation 355, the processing logic increments the allowed feedthrough count parameter by a certain amount for a subsequent iteration. For example, the processing logic might increment the allowed feedthrough count parameter by a fixed amount (e.g., two). A fixed amount of two is practical because generally a clock path with enter and exit a certain circuit component, thereby adding two additional feedthroughs. Once incremented, the processing logic can return to operation 340 and repeat operations 340-355 as many times as necessary. For example, in a second iteration, the allowedFTCount=2, and the processing logic may identify clock path 142, and so on. Once complete (i.e., when the allowed feedthrough count parameter reaches the maximum feedthrough count, the processing logic returns to operation 330.

Figure 5:
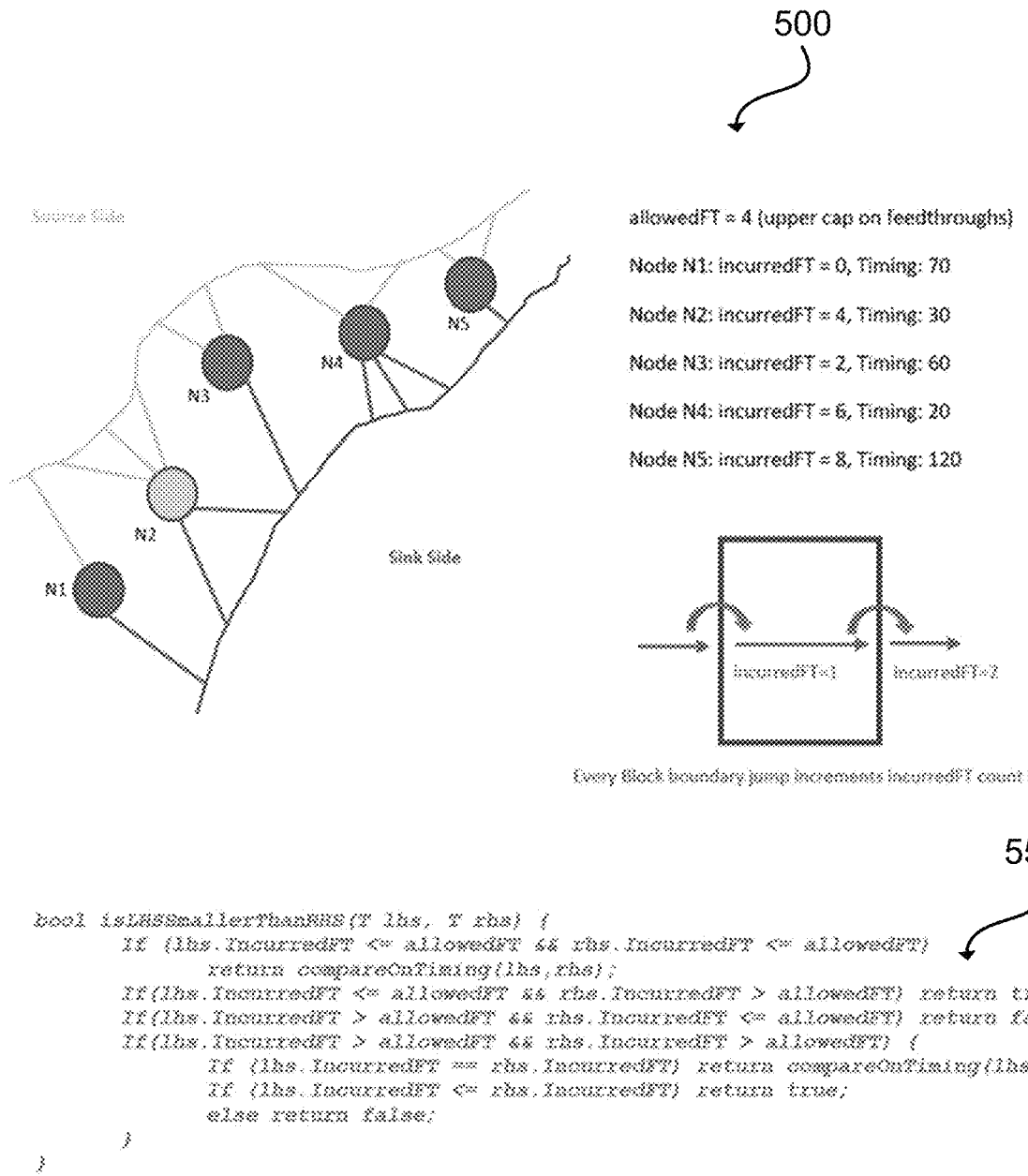
FIG. 5 is a diagram illustrating the identification of a clock tree topology solution for a specific feedthrough count in accordance with some embodiments of the present disclosure.

FIG. 5 is a diagram illustrating the identification of a clock tree topology solution for a specific feedthrough count in accordance with some embodiments of the present disclosure. In one embodiment, the processing logic uses the feedtiming cost vector with a decision function to generate a solution. As described in more detail below, the processing logic can ultimately generate various solutions in the range between a timing optimal solution and a feedthrough count optimal solution. In one embodiment, the decision function 550 can be used as comparator object for comparing nodes in a shortest path algorithm. In decision function 550, the values lhs and rhs represent two nodes of the graph 500 in the shortest path algorithm queue. The value allowedFT represents an upper cap on feedthrough counts which a final path should have. The value IncurredFT represents feedthroughs encountered so far on an explored path from the source-side towards the sink-side. The compareOnTiming( ) API can evaluate lhs and rhs only for their timing values.

In the diagram 500, an example is used to identify a clock path which contains at most four feedthroughs (i.e., allowedFTCount=4). In one embodiment, in order to identify which direction the clock path should go next, the comparator function looks at each possible node and determines the incurred feedthrough count and associated timing. The processing logic identifies those nodes with incurred feedthrough count less than the allowed feedthrough count for the current iteration and selects the node with lowest timing among those. This can be repeated from there for next set of possible nodes. The diagram 500 shows an exploration front of the shortest path algorithm at some stage of the traversal from clock source to sink. This example has five nodes N1, N2, N3, N4, N5. The current state of the nodes is described in the figure. When these states are used with above decision function, node N2 can be identified as winner. This node has minimum timing among all the nodes having incurredFT <=allowedFT. Thus, node N2 is selected to generate new candidates for the exploration front. This decision function can be used with different values of allowedFT to find various solutions.

Figure 6:
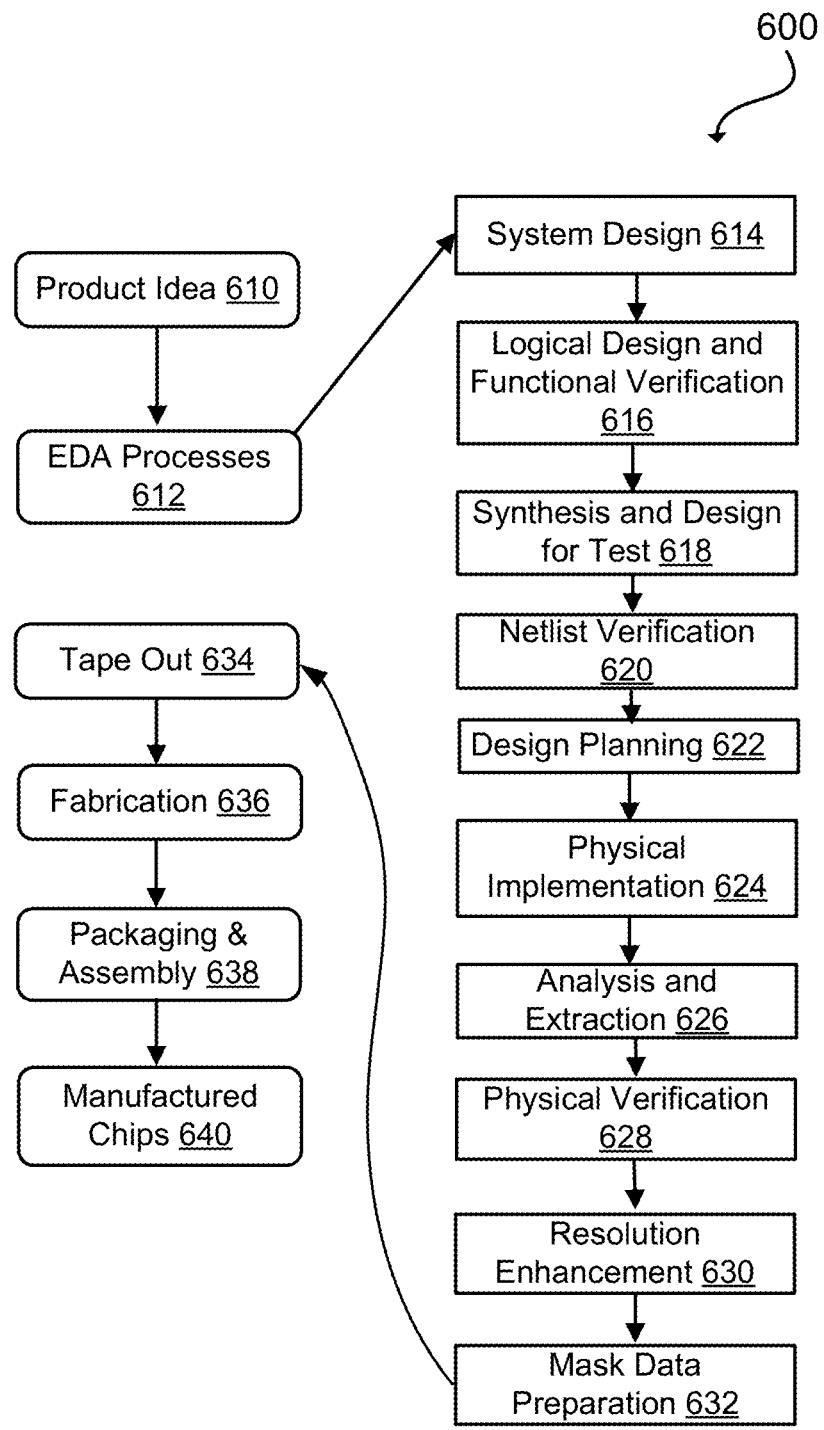
FIG. 6 depicts a flowchart of various processes used during the design and manufacture of an integrated circuit in accordance with some embodiments of the present disclosure.

FIG. 6 illustrates an example set of processes 600 used during the design, verification, and fabrication of an article of manufacture such as an integrated circuit to transform and verify design data and instructions that represent the integrated circuit. Each of these processes can be structured and enabled as multiple modules or operations. The term 'EDA' signifies the term 'Electronic Design Automation.' These processes can start with the creation of a product idea 610 with information supplied by a designer, information which is transformed to create an article of manufacture that uses a set of EDA processes 612. When the design is finalized, the design is taped-out 634, which is when artwork (e.g., geometric patterns) for the integrated circuit is sent to a fabrication facility to manufacture the mask set, which is then used to manufacture the integrated circuit. After tape-out, a semiconductor die can be fabricated 636 and packaging and assembly processes 638 can be performed to produce the finished integrated circuit 640.

Specifications for a circuit or electronic structure may range from low-level transistor material layouts to high-level description languages. A high-level of abstraction may be used to design circuits and systems, using a hardware description language ('HDL') such as VHDL, Verilog, SystemVerilog, SystemC, MyHDL or OpenVera. The HDL description can be transformed to a logic-level register transfer level ('RTL') description, a gate-level description, a layout-level description, or a mask-level description. Each lower abstraction level that is a less abstract description adds more useful detail into the design description, for example, more details for the modules that include the description. The lower levels of abstraction that are less abstract descriptions can be generated by a computer, derived from a design library, or created by another design automation process. An example of a specification language at a lower level of abstraction language for specifying more detailed descriptions is SPICE, which can be used for detailed descriptions of circuits with many analog components. Descriptions at each level of abstraction are enabled for use by the corresponding tools of that layer (e.g., a formal verification tool). A design process may use a sequence depicted in FIG. 6. The processes described herein can be enabled by EDA products (or tools).

During system design 614, functionality of an integrated circuit to be manufactured is specified. The design may be optimized for desired characteristics such as power consumption, performance, area (physical and/or lines of code), and reduction of costs, etc. Partitioning of the design into different types of modules or components can occur at this stage.

During logic design and functional verification 616, modules or components in the circuit can be specified in one or more description languages and the specification can be checked for functional accuracy. For example, the components of the circuit may be verified to generate outputs that match the requirements of the specification of the circuit or system being designed. Functional verification may use simulators and other programs such as testbench generators, static HDL checkers, and formal verifiers. In some embodiments, special systems of components referred to as 'emulators' or 'prototyping systems' can be used to speed up the functional verification.

During synthesis and design for test 618, HDL code can be transformed to a netlist. In some embodiments, a netlist may be a graph structure where edges of the graph structure represent components of a circuit and where the nodes of the graph structure represent how the components are interconnected. Both the HDL code and the netlist are hierarchical articles of manufacture that can be used by an EDA product to verify that the integrated circuit, when manufactured, performs according to the specified design. The netlist can be optimized for a target semiconductor manufacturing technology. Additionally, the finished integrated circuit may be tested to verify that the integrated circuit satisfies the requirements of the specification.

During netlist verification 620, the netlist can be checked for compliance with timing constraints and for correspondence with the HDL code. During design planning 622, an overall floor plan for the integrated circuit can be constructed and analyzed for timing and top-level routing.

During layout or physical implementation 624, physical placement (positioning of circuit components such as transistors or capacitors) and routing (connection of the circuit components by multiple conductors) can occur, and the selection of cells from a library to enable specific logic functions can be performed. As used herein, the term 'cell' may specify a set of transistors, other components, and interconnections that provides a Boolean logic function (e.g., AND, OR, NOT, XOR) or a storage function (such as a flipflop or latch). As used herein, a circuit 'block' may refer to two or more cells. Both a cell and a circuit block can be referred to as a module or component and can be enabled as both physical structures and in simulations. Parameters can be specified for selected cells (based on 'standard cells') such as size and made accessible in a database for use by EDA products.

During analysis and extraction 626, the circuit function can be verified at the layout level, which permits refinement of the layout design. During physical verification 628, the layout design can be checked to ensure that manufacturing constraints are correct, such as DRC constraints, electrical constraints, lithographic constraints, and that circuitry function matches the HDL design specification. During resolution enhancement 630, the geometry of the layout can be transformed to improve how the circuit design is manufactured.

During tape-out, data can be created to be used (after lithographic enhancements are applied if appropriate) for production of lithography masks. During mask data preparation 632, the 'tape-out' data is used to produce lithography masks that are used to produce finished integrated circuits.

A storage subsystem of a computer system (such as computer system 900 of FIG. 9) may be used to store the programs and data structures that are used by some or all of the EDA products described herein, and products used for development of cells for the library and for physical and logical design that use the library.

FIG. 7 illustrates an example machine of a computer system 700 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 700 includes a processing device 702, a main memory 704 (e.g., read-only memory (ROM), flash memory, dynamic random access memory (DRAM) such as synchronous DRAM (SDRAM), a static memory 706 (e.g., flash memory, static random access memory (SRAM), etc.), and a data storage device 718, which communicate with each other via a bus 730.

Processing device 702 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 702 may also be one or more special-purpose processing devices such as an application specific integrated circuit (ASIC), a field programmable gate array (FPGA), a digital signal processor (DSP), network processor, or the like. The processing device 702 may be configured to execute instructions 726 for performing the operations and steps described herein.

The computer system 700 may further include a network interface device 708 to communicate over the network 720. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), a graphics processing unit 722, a signal generation device 716 (e.g., a speaker), graphics processing unit 722, video processing unit 728, and audio processing unit 732.

The data storage device 718 may include a machine-readable storage medium 724 (also known as a non-transitory computer-readable medium) on which is stored one or more sets of instructions 726 or software embodying any one or more of the methodologies or functions described herein. The instructions 726 may also reside, completely or at least partially, within the main memory 704 and/or within the processing device 702 during execution thereof by the computer system 700, the main memory 704 and the processing device 702 also constituting machine-readable storage media.

In some implementations, the instructions 726 include instructions to implement functionality corresponding to the present disclosure. While the machine-readable storage medium 724 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 702 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

What is claimed is:

1. A method comprising:
   identifying, by a processing device, a first clock tree topology for a circuit design, the first clock tree topology having a threshold feedthrough count and a first timing solution;
   identifying, by the processing device, one or more additional clock tree topologies for the circuit design, each of the one or more additional clock tree topologies having a different respective feedthrough count that is less than the threshold feedthrough count, and each of the one or more additional clock tree topologies comprising a respective timing solution;
   receiving a selection of at least one of the first clock tree topology or the one or more additional clock tree topologies; and
   generating the circuit design according to the selection.

2. The method of claim 1, wherein the first clock tree topology and the one or more additional clock tree topologies each comprise a respective clock path extending from a clock source to a load.

3. The method of claim 2, wherein the circuit design comprises one or more circuit components arranged in a physical layout, and wherein the threshold feedthrough count and the different respective feedthrough counts each comprise a respective number of times that the respective clock path crosses a boundary of the one or more circuit components.

4. The method of claim 3, wherein generating the circuit design according to the selection comprises forming the clock path with respect to the one or more circuit components to have the respective feedthrough count of the selected clock tree topology.

5. The method of claim 1, wherein identifying the one or more additional clock tree topologies comprises:
performing a number of iterations of a clock tree topology process incorporating a feed-timing cost parameter, each iteration to identify a respective additional clock tree topology;
setting an allowed feedthrough count to zero for a first iteration of the number of iterations; and
incrementing the allowed feedthrough count by a set amount for any additional iterations of the number of iterations.

6. The method of claim 5, wherein the feed-timing cost parameter comprises a vector of path-length and encountered feedthroughs count.

7. The method of claim 1, further comprising:
causing presentation of the first clock tree topology and the one or more additional clock tree topologies for selection in a user interface.

8. A system comprising:
a memory; and
a processing device, coupled to the memory and configured to perform operations comprising:
identifying a first clock tree topology for a circuit design, the first clock tree topology having a threshold feedthrough count and a first timing solution;
identifying one or more additional clock tree topologies for the circuit design, each of the one or more additional clock tree topologies having a different respective feedthrough count that is less than the threshold feedthrough count, and each of the one or more additional clock tree topologies comprising a respective timing solution;
receiving a selection of at least one of the first clock tree topology or the one or more additional clock tree topologies; and
generating the circuit design according to the selection.

9. The system of claim 8, wherein the first clock tree topology and the one or more additional clock tree topologies each comprise a respective clock path extending from a clock source to a load.

10. The system of claim 9, wherein the circuit design comprises one or more circuit components arranged in a physical layout, and wherein the threshold feedthrough count and the different respective feedthrough counts each comprise a respective number of times that the respective clock path crosses a boundary of the one or more circuit components.

11. The system of claim 10, wherein generating the circuit design according to the selection comprises forming the clock path with respect to the one or more circuit components to have the respective feedthrough count of the selected clock tree topology.

12. The system of claim 8, wherein identifying the one or more additional clock tree topologies comprises:
performing a number of iterations of a clock tree topology process incorporating a feed-timing cost parameter, each iteration to identify a respective additional clock tree topology;
setting an allowed feedthrough count to zero for a first iteration of the number of iterations; and
incrementing the allowed feedthrough count by a set amount for any additional iterations of the number of iterations.

13. The system of claim 12, wherein the feed-timing cost parameter comprises a vector of path-length and encountered feedthroughs count.

14. The system of claim 8, wherein the processing device is configured to perform operations further comprising:
causing presentation of the first clock tree topology and the one or more additional clock tree topologies for selection in a user interface.

15. A non-transitory computer-readable storage medium storing instructions which, when executed, cause a processing device to perform operations comprising:
identifying, by the processing device, a first clock tree topology for a circuit design, the first clock tree topology having a threshold feedthrough count and a first timing solution;
identifying, by the processing device, one or more additional clock tree topologies for the circuit design, each of the one or more additional clock tree topologies having a different respective feedthrough count that is less than the threshold feedthrough count, and each of the one or more additional clock tree topologies comprising a respective timing solution;
receiving a selection of at least one of the first clock tree topology or the one or more additional clock tree topologies; and
generating the circuit design according to the selection.

16. The non-transitory computer-readable storage medium of claim 15, wherein the first clock tree topology and the one or more additional clock tree topologies each comprise a respective clock path extending from a clock source to a load.

17. The non-transitory computer-readable storage medium of claim 16, wherein the circuit design comprises one or more circuit components arranged in a physical layout, and wherein the threshold feedthrough count and the different respective feedthrough counts each comprise a respective number of times that the respective clock path crosses a boundary of the one or more circuit components.

18. The non-transitory computer-readable storage medium of claim 15, wherein identifying the one or more additional clock tree topologies comprises:
performing a number of iterations of a clock tree topology process incorporating a feed-timing cost parameter, each iteration to identify a respective additional clock tree topology;
setting an allowed feedthrough count to zero for a first iteration of the number of iterations; and
incrementing the allowed feedthrough count by a set amount for any additional iterations of the number of iterations.

19. The non-transitory computer-readable storage medium of claim 18, wherein the feed-timing cost parameter comprises a vector of path-length and encountered feed-throughs count.

20. The non-transitory computer-readable storage medium of claim 15, wherein the instructions cause the processing device to perform operations further comprising:
   causing presentation of the first clock tree topology and the one or more additional clock tree topologies for selection in a user interface.

\* \* \* \* \*